(12) United States Patent
Kudo et al.

(10) Patent No.: US 12,085,424 B2
(45) Date of Patent: Sep. 10, 2024

(54) SIGNAL MEASUREMENT UNIT

(71) Applicant: OMRON Corporation, Kyoto (JP)

(72) Inventors: Masaya Kudo, Osaka (JP); Hitoshi Oba, Kameoka (JP)

(73) Assignee: OMRON Corporation, Kyoto (JP)

( * ) Notice: Subject to any disclaimer, the term of this patent is extended or adjusted under 35 U.S.C. 154(b) by 463 days.

(21) Appl. No.: 17/605,242

(22) PCT Filed: Mar. 10, 2020

(86) PCT No.: PCT/JP2020/010165
§ 371 (c)(1),
(2) Date: Oct. 21, 2021

(87) PCT Pub. No.: WO2020/230425
PCT Pub. Date: Nov. 19, 2020

(65) Prior Publication Data
US 2022/0196441 A1 Jun. 23, 2022

(30) Foreign Application Priority Data

May 10, 2019 (JP) ................. 2019-090134

(51) Int. Cl.
*G01D 5/244* (2006.01)
(52) U.S. Cl.
CPC .................... *G01D 5/244* (2013.01)
(58) Field of Classification Search
CPC ................. G01D 5/244; H04Q 9/00
See application file for complete search history.

(56) References Cited

U.S. PATENT DOCUMENTS

| 11,454,524 | B2* | 9/2022 | Günther | ................. G01D 9/005 |
| 11,587,421 | B2* | 2/2023 | Sunderdiek | ............. H03M 1/34 |
| 11,611,946 | B2* | 3/2023 | Zhuge | ............... H04W 56/0035 |
| 2010/0201373 | A1* | 8/2010 | Sato | .................... G01D 5/24461 |
| | | | | 324/537 |

(Continued)

FOREIGN PATENT DOCUMENTS

| CN | 101833049 | 9/2010 |
| CN | 104471441 | 3/2015 |
| CN | 104702284 | 6/2015 |

(Continued)

OTHER PUBLICATIONS

"Search Report of Europe Counterpart Application", issued on Dec. 20, 2022, p. 1-p. 7.

(Continued)

*Primary Examiner* — Yaritza Guadalupe-McCall
(74) *Attorney, Agent, or Firm* — JCIPRNET

(57) ABSTRACT

In order to save on costs and space when processing analogue signals and pulse signals, a signal measurement unit (2) comprises: an input unit (21) which inputs an electrical signal from a device and selects whether to transmit the signal to an analogue measurement unit (22) or a counting measurement unit (23); the analogue measurement unit which measures voltage as an analogue value; and the counting measurement unit which counts the number of times that the voltage value has equaled or exceeded a first threshold value or the number of times that the voltage value has equaled or fallen below a second threshold value.

4 Claims, 8 Drawing Sheets

(56) References Cited

U.S. PATENT DOCUMENTS

2023/0400522 A1* 12/2023 Ogue .................. H02J 7/0013

FOREIGN PATENT DOCUMENTS

| CN | 109542040 | | 3/2019 |
| --- | --- | --- | --- |
| JP | 02053371 A | * | 2/1990 |
| JP | H02-027571 | | 2/1990 |
| JP | H0227571 U | * | 2/1990 |
| JP | 2000347710 | | 12/2000 |
| JP | 2001188983 | | 7/2001 |
| JP | 2005302006 | | 10/2005 |
| JP | 2010203903 | | 9/2010 |
| JP | 2012014677 | | 1/2012 |
| JP | 2016127526 | | 7/2016 |

OTHER PUBLICATIONS

Office Action of Japan Counterpart Application, with English translation thereof, issued on Feb. 28, 2023, pp. 1-6.

"Office Action of China Counterpart Application", issued on Sep. 21, 2023, with English translation thereof, p. 1-p. 19.

"International Search Report (Form PCT/ISA/210) of PCT/JP2020/010165", mailed on Jun. 9, 2020, with English translation thereof, pp. 1-4.

"Written Opinion of the International Searching Authourity (Form/ISA/237) of PCT/JP2020/010165", mailed on Jun. 9, 2020, with English translation thereof, pp. 1-6.

* cited by examiner

| elapsed time | output | | | |
|---|---|---|---|---|
| | normal mode | simple counter mode | | |
| | analogue input value [V] | rising number of times counting mode | falling number of times counting mode | rising/falling number of times counting mode |
| 0 | 0 | 0 | 0 | 0 |
| 10 | 0 | 0 | 0 | 0 |
| 20 | 0 | 0 | 0 | 0 |
| 30 | 0 | 0 | 0 | 0 |
| 40 | 0 | 0 | 0 | 0 |
| 50 | 2.5 | 0 | 0 | 0 |
| 60 | 5 | 1 | 0 | 1 |
| 70 | 5 | 1 | 0 | 1 |
| 80 | 5 | 1 | 0 | 1 |
| 90 | 5 | 1 | 0 | 1 |
| 100 | 2.5 | 1 | 0 | 1 |
| 110 | 0 | 1 | 1 | 2 |
| 120 | 0 | 1 | 1 | 2 |
| 130 | 0 | 1 | 1 | 2 |
| 140 | 0 | 1 | 1 | 2 |
| 150 | 2.5 | 1 | 1 | 2 |
| 160 | 5 | 2 | 1 | 3 |
| 170 | 5 | 2 | 1 | 3 |
| 180 | 5 | 2 | 1 | 3 |
| 190 | 5 | 2 | 1 | 3 |
| 200 | 2.5 | 2 | 1 | 3 |
| 210 | 0 | 2 | 2 | 4 |
| 220 | 0 | 2 | 2 | 4 |

| item name | setting value |
|---|---|
| input mode/Ch1 | counter mode ▼ |
| input mode/Ch2 | analogue mode ▼ |

(b)

(a)

| item name | setting value | remarks |
|---|---|---|
| count value-matching analogue sampling function | enable (Ch1) | select from disable/enable (Ch1)/enable (Ch2) |
| count value-matching analogue sampling target (Ch1) | disable | select from disable/enable |
| count value-matching analogue sampling target (Ch2) | enable | select from disable/enable |
| count value-matching analogue sampling mode | start count value/end count value/point number specification | "change amount specification" or "table specification" can be selected additionally |
| start count value | 10 | arbitrary numerical value |
| end count value | 100 | arbitrary numerical value |
| point number | 10 | arbitrary numerical value |
| change amount | 0 | arbitrary numerical value |
| table [0] | 0 | arbitrary numerical value |
| table [1] | 0 | arbitrary numerical value |
| table [2] | 0 | arbitrary numerical value |
| : | | |
| table [n] | 0 | arbitrary numerical value |

(b)

| count value (Ch1) | count value (Ch2) |
|---|---|
| 10 | 0.5 |
| 20 | 1 |
| 30 | 1.5 |
| 40 | 2 |
| 50 | 2.5 |
| 60 | 3 |
| 70 | 3.1 |
| 80 | 3.2 |
| 90 | 3.3 |
| 100 | 3.4 |

FIG. 7

SIGNAL MEASUREMENT UNIT

CROSS-REFERENCE TO RELATED APPLICATION

This application is a 371 application of the International PCT application serial no. PCT/JP2020/010165, filed on Mar. 10, 2020, which claims the priority benefits of Japan Patent Application No. 2019-090134, filed on May 10, 2019. The entirety of each of the above-mentioned patent applications is hereby incorporated by reference herein and made a part of this specification.

BACKGROUND

Technical Field

The present invention relates to a signal measurement unit that processes analogue signals and pulse signals.

Related Art

Conventionally, a technique for counting a pulse signal output from a rotary encoder, a flow meter, or the like by a high-speed counter unit is known.

LITERATURE OF RELATED ART

Patent Literature

Patent literature 1: Japanese Patent Laid-Open No. 2005-302006

Patent literature 2: Japanese Patent Laid-Open No. 2016-127526

SUMMARY

Problems to be Solved

When a pulse signal is counted, it is necessary to detect a voltage (High or Low) of the pulse by a digital circuit and count the number of times the voltage of the pulse changes, and a high-speed counter unit is indispensable for that purpose.

Therefore, for example, when an analogue value is sampled and output in synchronization with a position (pulse) of a rotary encoder, it is necessary to separately prepare a high-speed counter unit that counts the pulse signal and a high-speed analogue unit that processes the analogue signal. Regarding this, there is a problem that the cost is increased and a space for installing two devices must be secured.

Moreover, Patent literature 1 discloses a technique for detecting the maximum and minimum of an input analogue signal and counting the number of times thereof. In addition, Patent literature 2 discloses a technique for binarizing and counting an analogue signal. However, neither of the patent literatures solves the above problem.

One aspect of the present invention is to save on costs and space when processing analogue signals and pulse signals.

Means to Solve Problems

In order to solve the above problems, a signal measurement unit according to one aspect of the present invention includes: an input unit that inputs an electric signal output from an external signal output equipment; an analogue measurement unit that measures a voltage value of the electric signal input in the input unit as an analogue value; and a counting measurement unit that counts at least one of the number of times that the voltage value of the electric signal input in the input unit has equalled or exceeded a predetermined first threshold value and the number of times that the voltage value has equalled or fallen below a predetermined second threshold value. The input unit selects whether to transmit the electric signal that is input to the analogue measurement unit or to the counting measurement unit.

Effect

According to one aspect of the present invention, it is possible to realize cost saving and space saving when processing analogue signals and pulse signals.

BRIEF DESCRIPTION OF THE DRAWINGS

FIG. 3 is a diagram showing a numerical value example of the input/output data of the signal measurement unit according to Embodiment 1 of the present invention.

FIG. 7 is a diagram showing data related to an analogue value and a count value according to Embodiment 1 of the present invention.

DESCRIPTION OF THE EMBODIMENTS

Embodiment 1

Figure 1:
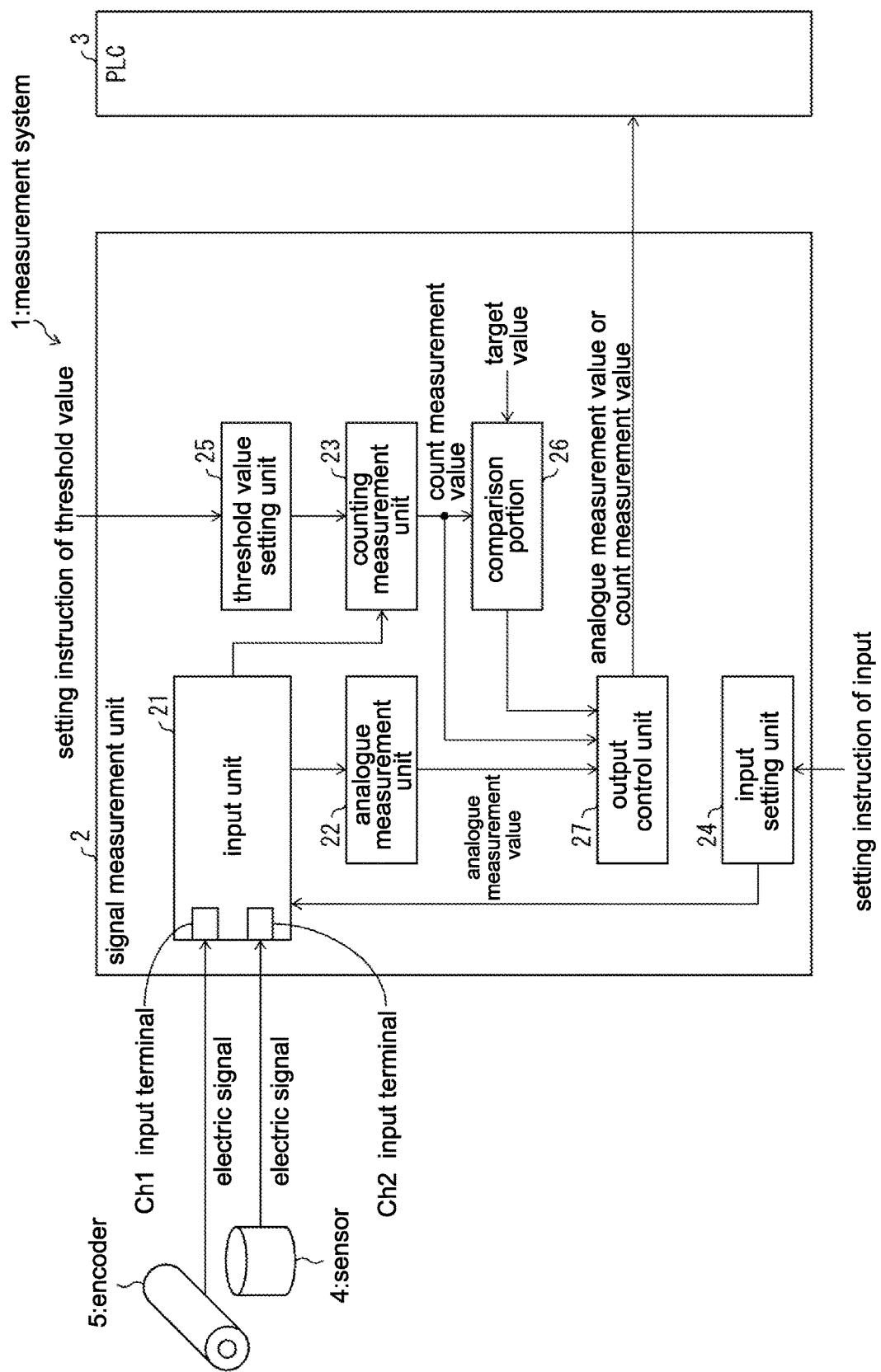
FIG. 1 is a block diagram showing a configuration of a measurement system according to Embodiment 1 of the present invention.

Hereinafter, an embodiment according to one aspect of the present invention (hereinafter, also referred to as "the present embodiment") is described with reference to FIGS. 1 to 8. Note that, the same or corresponding parts in the drawings are designated by the same reference numerals, and the description thereof will not be repeated. In the present embodiment, for example, a signal measurement unit 2 is described as a typical example of a counter unit. In order to facilitate understanding of the signal measurement unit 2 according to one aspect of the present invention, first, an overview of a measurement system 1 including the signal measurement unit 2 is described with reference to FIG. 1.

§ 1. Application Example
(Overall Configuration of Measurement System 1)

FIG. 1 is a block diagram showing a configuration of the measurement system 1 according to the present embodiment. As shown in FIG. 1, the measurement system 1 includes the signal measurement unit 2 and a PLC 3.

The signal measurement unit 2 has a function of transmitting an analogue input value from a sensor 4 to the PLC 3 and a function of counting the number of times that the analogue input value from an encoder 5 crosses a specific threshold value and transmitting the count measurement value to the PLC 3, and switches between the analogue output signal and the count measurement value as a transmission target.

The PLC 3 is an industrial controller and controls a device to be controlled. A control unit of the PLC 3 may be bus-connected to the signal measurement unit 2, or may be connected to the signal measurement unit 2 by EtherCAT (registered trademark), EtherNet/IP (registered trademark), DeviceNet (registered trademark), CompoNet (registered trademark), or the like via a communication coupler. The PLC 3 acquires the analogue output signal and the count measurement value from the signal measurement unit 2 and performs predetermined processing (for example, an inspection of the shape of a workpiece or the like), for example.

The sensor 4 measures various data (for example, a vertical position of a workpiece moved by a conveyor or other data) and transmits the data to the signal measurement unit 2. The encoder 5 detects various data (for example, a lateral position of the workpiece moved by the conveyor or other data) and transmits a pulse signal corresponding to the detection result to the signal measurement unit 2. Moreover, instead of the encoder 5, another signal output equipment (for example, a flow meter or the like) may also be used.

§ 2. Configuration Example (Configuration of Signal Measurement Unit 2)

The signal measurement unit 2 includes an input unit 21, an analogue measurement unit 22, a counting measurement unit 23, an input setting unit 24, a threshold value setting unit 25, a comparison portion 26, and an output control unit 27.

The input unit 21 inputs an electric signal output from the sensor 4 and the encoder 5 (the external signal output equipment). The analogue measurement unit 22 measures the voltage value of the electric signal input in the input unit 21 as an analogue value. The counting measurement unit 23 counts at least one of the number of times that the voltage value of the electric signal input in the input unit 21 has equalled or exceeded a High level (a predetermined first threshold value) and the number of times that the voltage value of the electric signal input in the input unit 21 has equalled or fallen below a Low level (a predetermined second threshold value). Then, the input unit 21 selects whether to transmit the input electric signal to the analogue measurement unit 22 or to the counting measurement unit 23.

Moreover, the counting measurement unit 23 can count the pulse having a speed up to about ¼ of an A/D conversion speed (a sampling frequency) of an analogue unit.

In addition, the input unit 21 may include input terminals Ch1 and Ch2 (a plurality of input terminals). In this case, the input unit 21 selects whether to transmit the input electric signal to the analogue measurement unit 22 or to the counting measurement unit 23 for each of the input terminals Ch1 and Ch2.

The input setting unit 24 receives a setting instruction of whether to transmit the electric signal input in the input unit 21 to the analogue measurement unit 22 or to the counting measurement unit 23 via a communication line.

The threshold value setting unit 25 receives a setting instruction of at least one of the High level and the Low level via a communication line.

The comparison portion 26 determines matching between the count measurement value and a target value. The count measurement value is obtained by measuring the electric signal input at the input terminal Ch1 (a first input terminal) by the counting measurement unit 23. If the comparison portion 26 determines that the count measurement value matches the target value, the output control unit 27 may output the analogue measurement value obtained by measuring the electric signal input at the input terminal Ch2 (a second input terminal) by the analogue measurement unit 22 at that time.

Furthermore, if the comparison portion 26 determines that the count measurement value matches the target value, the output control unit 27 may store the analogue measurement value obtained by measuring the electric signal input at the input terminal Ch2 by the analogue measurement unit 22 in a buffer at that time, and output a plurality of analogue measurement values stored in the buffer to a PLC (an external device) 4 in a predetermined communication cycle for communication.

Moreover, the signal measurement unit 2 may be configured to receive the setting instruction of whether to transmit the input electric signal to the analogue measurement unit 22 or to the counting measurement unit 23 and the setting instruction of a threshold value such as the High level, the Low level, or the like from a setting value input device such as a notebook PC or the like via a universal serial bus (USB), for example, or may be configured to receive the setting instructions from the PLC 3 to which the setting value input device is connected via a communication network (Ethernet (registered trademark) or the like).

(Example of Input/Output Data)

Figure 2:
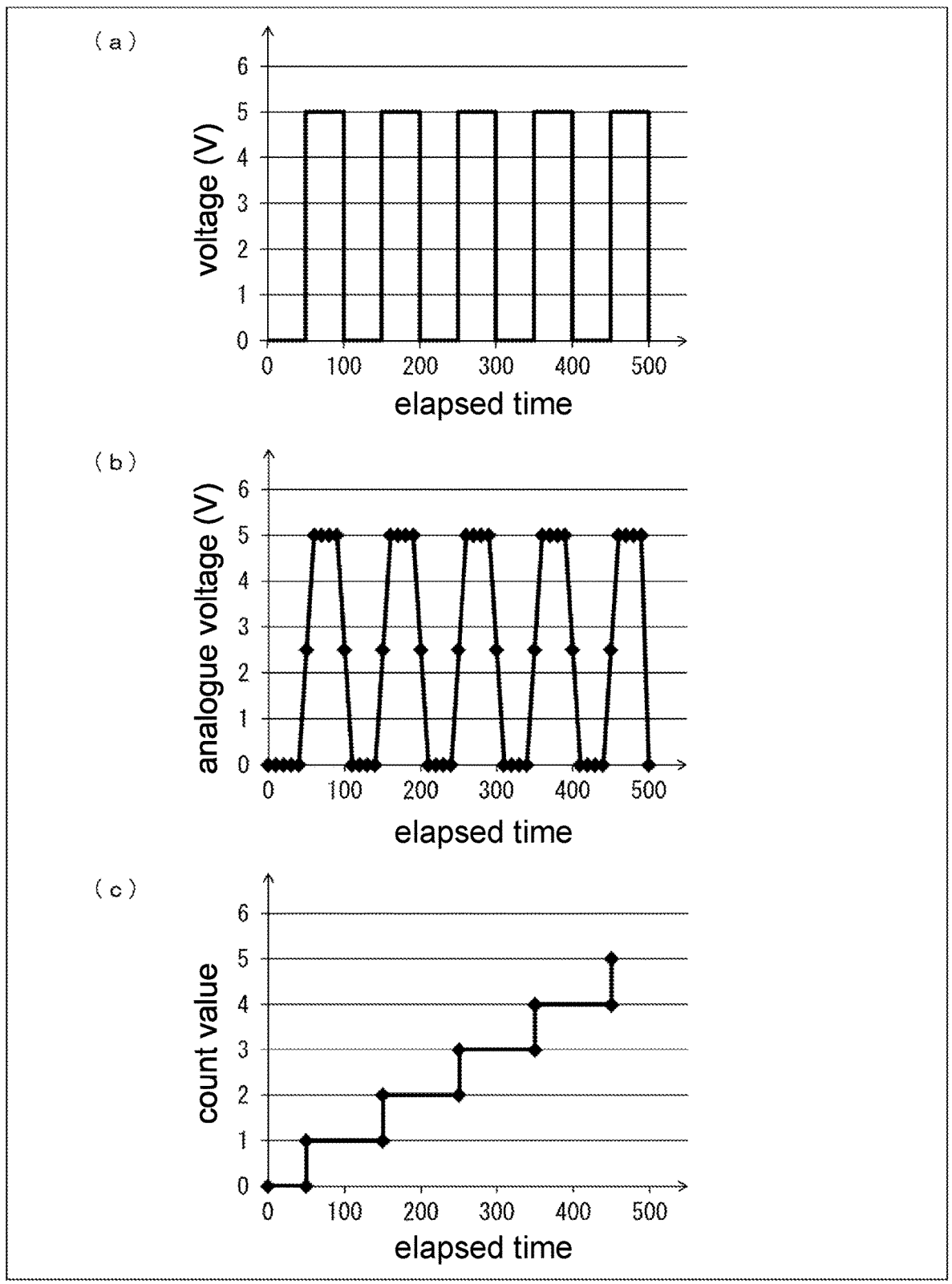
FIG. 2 is a diagram showing input/output data of a signal measurement unit according to Embodiment 1 of the present invention.

FIG. 2 is a diagram showing an example of input/output data of the signal measurement unit 2 according to the present embodiment. (a) of FIG. 2 shows an example of input data of the signal measurement unit 2, and particularly shows a waveform of the pulse signal output from a rotary encoder, a flow meter, or the like.

(b) of FIG. 2 shows an example of output data of the signal measurement unit 2, and particularly shows an example of the output data when the signal measurement unit 2 is in an analogue mode (a normal mode). When the analogue mode is selected according to the setting instruction, the signal measurement unit 2 outputs the pulse signal in (a) of FIG. 2 as an analogue signal to the PLC 3 as shown in (b) of FIG. 2.

(c) of FIG. 2 shows an example of output data of the signal measurement unit 2, and particularly shows an example of the output data when the signal measurement unit 2 is in a counter mode (a simple counter mode). When the counter mode is selected according to the setting instruction, the signal measurement unit 2 outputs the count value for the pulse signal in (a) of FIG. 2 to the PLC 3 as shown in (c) of FIG. 2. That is, the signal measurement unit 2 can realize the same function as the high-speed counter unit in a state of including a hardware circuit of an analogue input unit.

Moreover, the signal measurement unit 2 has a function of acquiring an analogue signal from another input terminal and outputting the analogue signal to the PLC 3 at the timing when the count value of the pulse signal from one input terminal reaches the target value set previously.

FIG. 3 is a diagram showing a numerical value example of input/output data of the signal measurement unit 2 according to the present embodiment. As shown in FIG. 3, in the case of the analogue mode, the signal measurement unit 2 outputs the analogue input value as an analogue signal. In the case of the counter mode, the signal measurement unit 2 outputs the count value corresponding to the analogue input value.

The counter mode can be selected from any of a rising number of times counting mode, a falling number of times counting mode, and a rising/falling number of times counting mode.

In the case of the rising number of times counting mode, the signal measurement unit 2 adds 1 to the count value when the analogue input value changes from 2.5 [V] to 5 [V] (when the elapsed time is 60 and 160). In the case of the falling number of times counting mode, the signal measurement unit 2 adds 1 to the count value when the analogue input value changes from 2.5 [V] to 0 [V] (when the elapsed time is 110 and 210).

In the case of the rising/falling number of times counting mode, the signal measurement unit 2 adds 1 to the count value when the analogue input value changes from 2.5 [V] to 5 [V] and when the analogue input value changes from 2.5 [V] to 0 [V].

Figure 4:
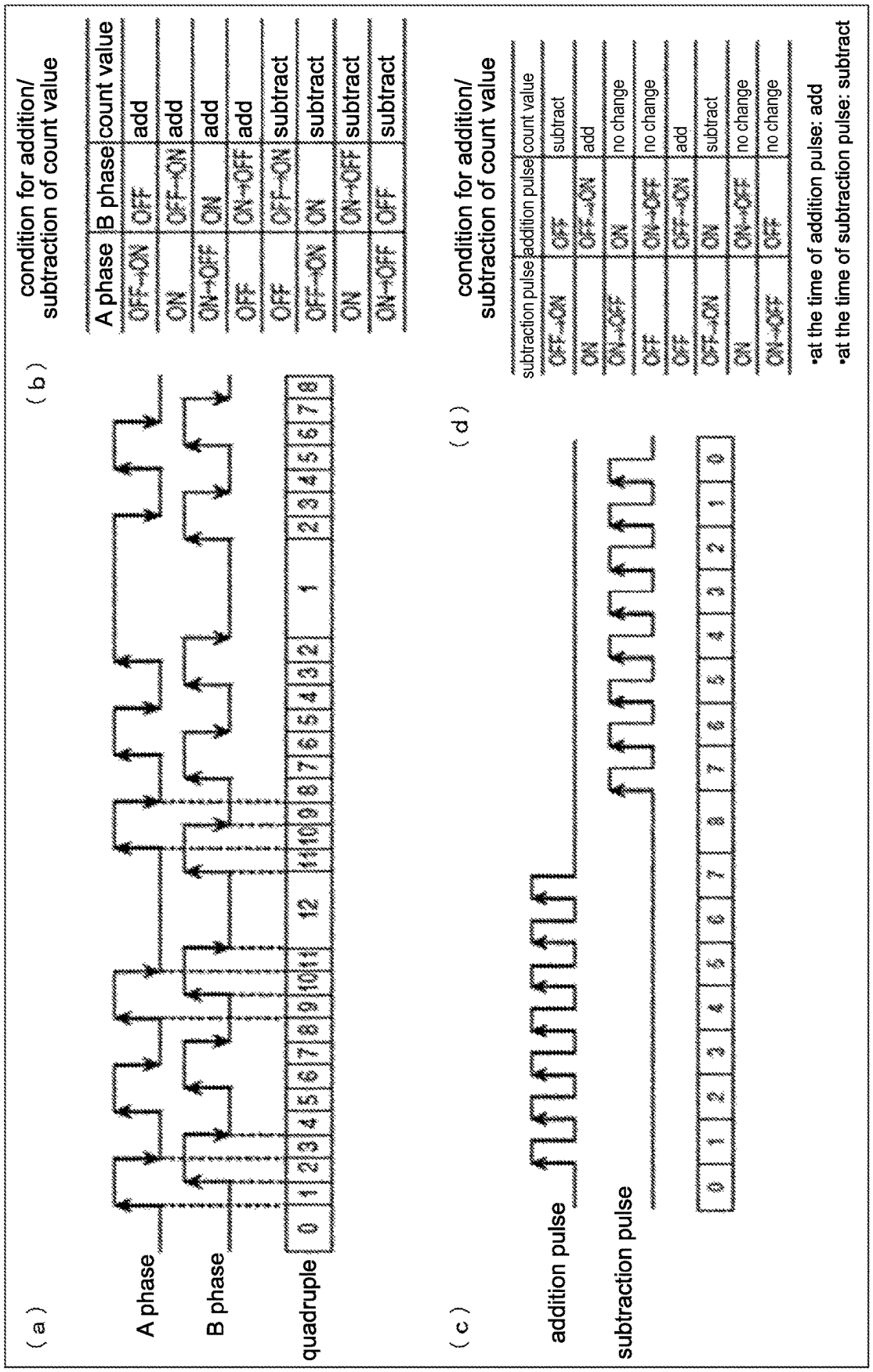
FIG. 4 is a diagram showing an example in which the signal measurement unit according to Embodiment 1 of the present invention counts using pulse signals in two channels.

FIG. 4 is a diagram showing an example in which the signal measurement unit 2 according to the present embodiment counts using pulse signals in two channels. (a) of FIG. 4 shows an example of phase difference input pulses. (b) of FIG. 4 shows an example of the count value for the phase difference input pulses. As shown in (a) and (b) of FIG. 4, the signal measurement unit 2 inputs two-phase signals (an A phase and a B phase) and adds or subtracts the count value according to the phase difference between the signals (quadruple).

(c) of FIG. 4 shows an example of addition/subtraction pulses. (d) of FIG. 4 shows an example of the count value for the addition/subtraction pulses. As shown in (c) and (d) of FIG. 4, the signal measurement unit 2 inputs the addition pulse signal and the subtraction pulse signal, and adds or subtracts the count value according to a change in the signal.

Moreover, the signal measurement unit 2 performs counting processing corresponding to the phase difference input pulse or the addition/subtraction pulse according to the set modes (phase difference input pulse processing mode and addition/subtraction pulse processing mode). The mode setting is performed according to the setting instruction of a user.

(Switching Setting between Analogue Mode and Counter Mode)

Figure 5:
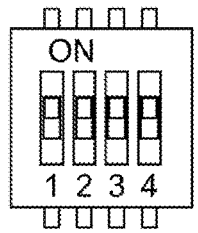
FIG. 5 is a diagram showing an example of a method of switching between an analogue mode and a counter mode in the signal measurement unit according to Embodiment 1 of the present invention.

FIG. 5 is a diagram showing an example of a method of switching between the analogue mode and the counter mode in the signal measurement unit 2 according to the present embodiment. (a) of FIG. 5 shows an example of a setting screen displayed by a tool used in a setting value input device such as a PC or the like. As shown in (a) of FIG. 5, the user can set the counter mode or the analogue mode for each of the input terminals Ch1 and Ch2.

(b) of FIG. 5 shows an example of a hardware switch attached to the signal measurement unit 2. As shown in (b) of FIG. 5, the user can set the counter mode or the analogue mode for each of the input terminals Ch1 and Ch2 by the switching of the switch.

(Threshold Value Setting Method)

Figure 6:
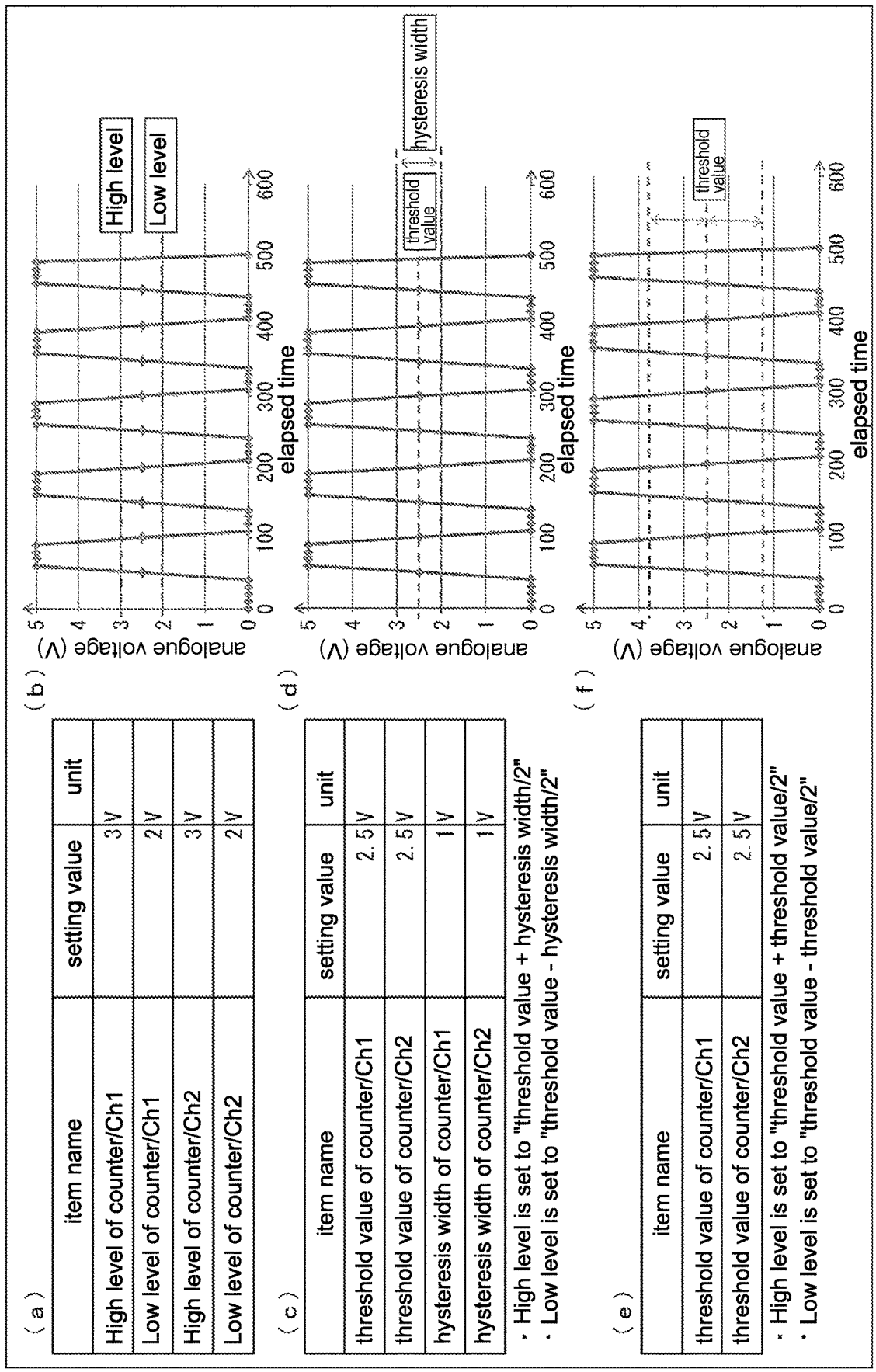
FIG. 6 is a diagram showing an example of a method of setting a threshold value in the signal measurement unit according to Embodiment 1 of the present invention.

FIG. 6 is a diagram showing an example of a method of setting a threshold value in the signal measurement unit 2 according to the present embodiment. (a), (c), and (e) of FIG. 6 respectively show an example of the setting screen displayed by the tool used in the setting value input device such as a PC or the like.

(a) of FIG. 6 shows an example of a screen for setting the High level (the first threshold value) and the Low level (the second threshold value) of the counter for each of the input terminals Ch1 and Ch2. (b) of FIG. 6 shows a graph of the High level and the Low level of the counter. As shown in (a) of FIG. 6, in the signal measurement unit 2, the High level and the Low level of the counter can be directly set for each of the input terminals Ch1 and Ch2.

(c) of FIG. 6 shows an example of a screen for setting the threshold value and the hysteresis width of the counter for each of the input terminals Ch1 and Ch2. (d) of FIG. 6 shows a graph of the threshold value and the hysteresis width of the counter. In this case, the High level is set to "threshold value+hysteresis width/2". In addition, the Low level is set to "threshold value−hysteresis width/2". As shown in (c) of FIG. 6, in the signal measurement unit 2, the threshold value and the hysteresis width for calculating the High level and the Low level of the counter can be set for each of the input terminals Ch1 and Ch2.

(e) of FIG. 6 shows an example of a screen for setting the threshold value of the counter for each of the input terminals Ch1 and Ch2. (f) of FIG. 6 shows a graph of the threshold value of the counter. In this case, the High level is set to "threshold value+threshold value/2". In addition, the Low level is set to "threshold value−threshold value/2". As shown in (e) of FIG. 6, in the signal measurement unit 2, the threshold value for calculating the High level and the Low level of the counter can be set for each of the input terminals Ch1 and Ch2.

(Processing of Outputting Analogue Value and Count Value in Association with each Other)

FIG. 7 is a diagram showing data related to the analogue value and the count value according to the present embodiment. (a) of FIG. 7 shows an example of a setting screen related to the processing of outputting the analogue value and the count value in association with each other. (b) of FIG. 7 shows the output data of the analogue value and the count value.

In (a) of FIG. 7, the item name being the name of the setting item, the setting value for the item, and the remarks are shown. Each item is described below.

The count value-matching analogue sampling function indicates whether to enable or disable the function of sampling the analogue values with matching count values (hereinafter referred to as "sampling function"), and specifies the input terminal to acquire the pulse signal to be counted when the sampling function is enabled.

The count value-matching analogue sampling target (Ch1) specifies whether to enable or disable the input of the analogue value being a target of the sampling function for the input terminal Ch1.

The count value-matching analogue sampling target (Ch2) specifies whether to enable or disable the input of the analogue value being a target of the sampling function for the input terminal Ch2.

The count value-matching analogue sampling mode (hereinafter referred to as "sampling mode") specifies a setting method of a count value being a target. In the sampling mode, "start count value/end count value/point number specification", "change amount specification", or "table specification" can be selected.

A start count value, an end count value, and a point number that need to be set when the "start count value/end count value/point number specification" is specified in the sampling mode is described below.

A first count value is set as the start count value. A last count value is set as the end count value. The number of the count values is set as the point number.

(b) of FIG. 7 shows output data of the signal measurement unit 2 corresponding to the setting screen in (a) of FIG. 7. The count value (Ch1) is a numerical value (10, 20, . . . , 90, 100) specified by the start count value, the end count value, and the point number in (a) of FIG. 7. The analogue value (Ch2) is an analogue value at the input terminal Ch2 at the timing when the count value is acquired by the pulse signal input to the input terminal Ch1.

Figure 8:
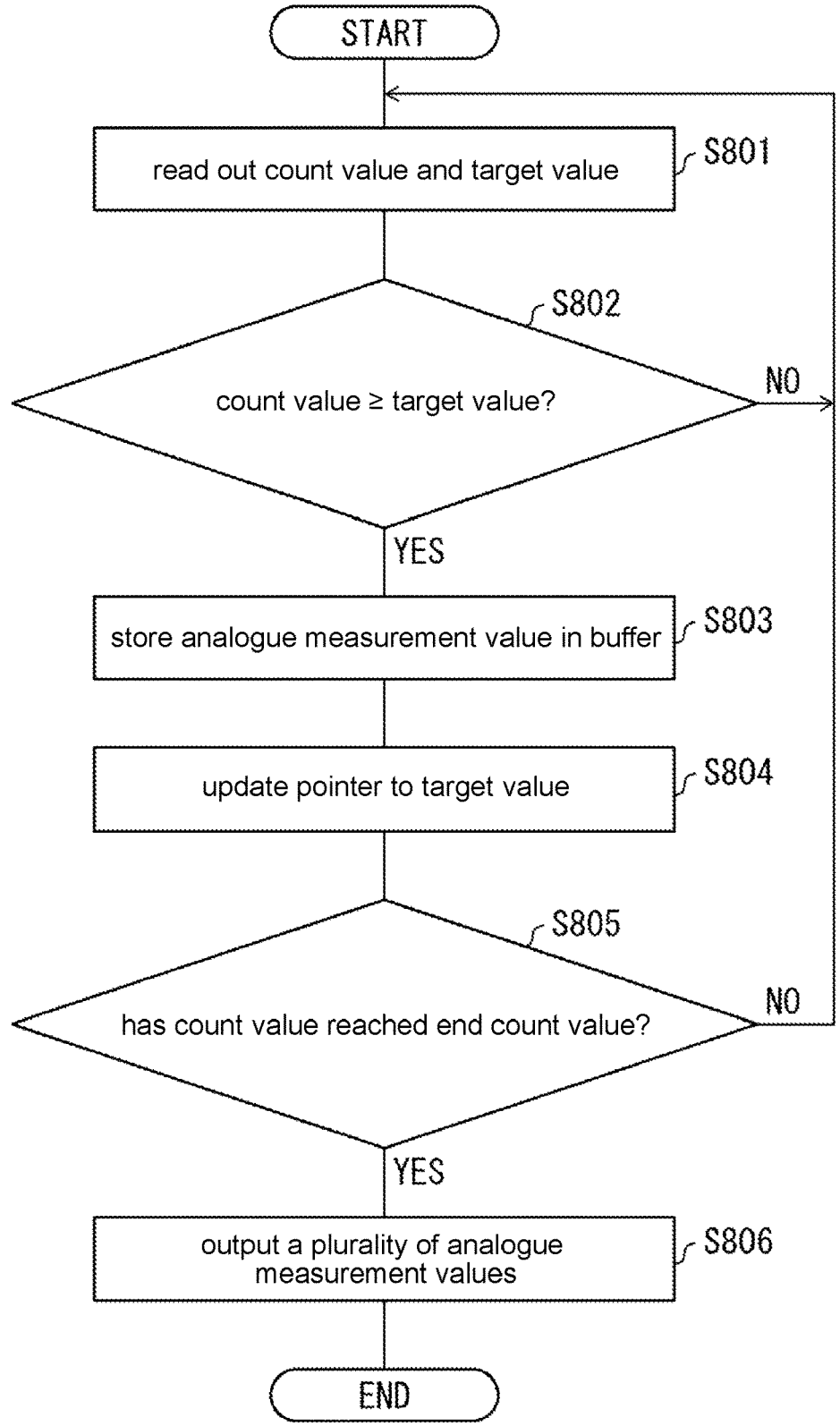
FIG. 8 is a flowchart showing processing of outputting the analogue value and the count value according to Embodiment 1 of the present invention in association with each other.

FIG. 8 is a flowchart showing processing of outputting the analogue value and the count value according to the present embodiment in association with each other.

(Step S801)

In the signal measurement unit 2, the comparison portion 26 reads out the count value from the counting measurement unit 23 and acquires the target value according to the pointer to the target value. Moreover, the counting measurement unit 23 counts the number of times that the pulse signal input at the input terminal Ch1 has equalled or exceeded the High level of the counter at any time. In addition, a plurality of target values are stored in a predetermined memory.

(Step S802)

The comparison portion 26 determines whether or not the count value is equal to or greater than the target value. When the count value is equal to or greater than the target value (YES in Step S802), the signal measurement unit 2 executes processing of Step S803. When the count value is not equal to or greater than the target value (less than the target value) (NO in Step S802), the signal measurement unit 2 executes the processing of Step S801 again.

(Step S803)

The output control unit 27 stores, in the buffer, the analogue measurement value obtained by measuring the electric signal input at the input terminal Ch2 by the analogue measurement unit 22.

(Step S804)

The signal measurement unit 2 updates the pointer to the target value.

(Step S805)

The signal measurement unit 2 determines whether or not the count value has reached the end count value. When the count value has reached the end count value (YES in Step S805), the signal measurement unit 2 executes processing of Step 806. When the count value has not reached the end count value (NO in Step S805), the signal measurement unit 2 executes the processing of Step 801 again.

(Step S806)

In the signal measurement unit 2, the output control unit 27 outputs the plurality of analogue measurement values stored in the buffer to the PLC 3 in a predetermined communication cycle for communication.

(Extension Function of Signal Measurement Unit 2)

As a further extension function, the signal measurement unit 2 stores, in the buffer, analogue input values of other channels at the timing when the count value reaches the value specified by the user, and later collectively transfers the analogue input values to the PLC 3. The method of specifying the count value has following variations.

(1) Specify the start count value, the end count value, and the point number for acquisition (for example, from 0 to 1000 in an increment of 10 or the like)

(2) Specify only the change amount (for example, +10 or the like) and repeat infinitely (3) List multiple count values in the table (0, 5, 10, 20 . . . )

Effect of the Present Embodiment

According to the above, it is not necessary to separately prepare a high-speed counter unit in an application that requires an analogue unit, and cost saving and space saving can be realized. Actually, because there are lots of analogue units on which a plurality of input terminals are mounted, when an unused input terminal exists, the input terminal can be effectively used for pulse signal input.

[Example of Implementation by Software]

The control blocks of the signal measurement unit 2 (specifically, the input unit 21, the analogue measurement unit 22, the counting measurement unit 23, the input setting unit 24, the threshold value setting unit 25, the comparison portion 26, and the output control unit 27) may be implemented by a logic circuit (hardware) formed in an integration circuit (an IC chip) or the like, or may be implemented by software.

In the latter case, the signal measurement unit 2 includes a computer that executes instructions of a program being software for implementing each function. The computer includes, for example, one or more processors and a computer-readable recording medium that stores the program. Besides, in the computer, the processor reads the program from the recording medium and executes the program, and thereby the object of the present invention is achieved. The processor may be, for example, a central processing unit (CPU). The recording medium may be a "non-temporary tangible medium", such as a read only memory (ROM), as well as a tape, a disk, a card, a semiconductor memory, a programmable logic circuit, or the like. In addition, the recording medium may further include a random access memory (RAM) or the like that deploys the above program. Additionally, the above program may be supplied to the computer via any transmission medium capable of transmitting the program (communication network, broadcast wave, or the like). Further, one aspect of the present invention may also be implemented in a form of a data signal embedded in a carrier wave, in which the above program is embodied by electronic transmission.

[Summary]

The signal measurement unit according to one aspect of the present invention includes: an input unit that inputs an electric signal output from an external signal output equipment; an analogue measurement unit that measures a voltage value of the electric signal input in the input unit as an analogue value; and a counting measurement unit that counts at least one of the number of times that the voltage value of the electric signal input in the input unit has equalled or exceeded a predetermined first threshold value and the number of times that the voltage value has equalled or fallen below a predetermined second threshold value. The input unit selects whether to transmit the electric signal that is input to the analogue measurement unit or to the counting measurement unit.

According to the above configuration, the signal measurement unit can be switched between a case of being made to function as an analogue output unit that measures and outputs an analogue value and a case of being made to function as a counter unit that counts and outputs the number of pulses of the pulse signal. Therefore, it is not necessary to prepare both the analogue output unit and the counter unit, and cost saving and space saving can be realized.

In the counter unit according to one aspect of the present invention, the input unit may include a plurality of input terminals, and may select whether to transmit the electric signal that is input to the analogue measurement unit or to the counting measurement unit for each of the input terminals.

According to the above configuration, it is possible to input electric signals output from a plurality of external signal output equipment in different types, and set, for each electric signal, whether to measure and output the analogue value or count and output the number of pulses of the pulse signal. Therefore, a signal measurement unit having high flexibility can be provided.

The counter unit according to one aspect of the present invention may further include an input setting unit that receives a setting instruction of whether to transmit the electric signal input in the input unit to the analogue measurement unit or to the counting measurement unit via a communication line.

According to the above configuration, whether to measure and output an analogue value or to count and output the number of pulses of a pulse signal can be set from the outside via a communication line.

The counter unit according to one aspect of the present invention may further include a threshold value setting unit that receives a setting instruction of at least one of the first threshold value and the second threshold value via a communication line.

According to the above configuration, the value of at least one of the first threshold value and the second threshold value can be changed from the outside via the communication line, and thus a counting operation can be performed according to the characteristic of the signal output equipment that outputs the pulse signal. Therefore, the accuracy of the counting operation can be improved.

The counter unit according to one aspect of the present invention may further include: a comparison portion that determines matching between a count measurement value and a target value, the count measurement value being obtained by measuring an electric signal input at the first input terminal of the input terminals by the counting measurement unit; and an output control unit that outputs, if the comparison portion determines that the count measurement value matches the target value, an analogue measurement value obtained by measuring the electric signal input at the second input terminal of the input terminals by the analogue measurement unit at that time.

According to the above configuration, when the count measurement value is, for example, a value indicating position information of an object to be measured, the target value that meets the required accuracy is set in advance, and thereby the analogue measurement value of another signal output equipment in the target value can be output. Therefore, the analogue measurement value can be output with sufficient accuracy.

In addition, because it is not necessary to perform an unnecessarily fine output from the signal measurement unit, the communication load and the data processing load on the external device can be suppressed.

In the counter unit according to one aspect of the present invention, if the comparison portion determines that the count measurement value matches the target value, the output control unit may store, in a buffer, an analogue measurement value obtained by measuring the electric signal input at the second input terminal of the input terminals by the analogue measurement unit at that time, and output a plurality of analogue measurement values stored in the buffer to an external device in a predetermined communication cycle for communication.

According to the above configuration, the association of the position with the analogue measurement value can be performed with sufficient accuracy without being affected by the communication cycle.

In addition, because the signal measurement unit buffers and outputs the analogue measurement value corresponding to the target value, the unevenness of the measurement accuracy due to the unevenness of the moving speed of the measurement target, which occurs when the counter output is performed in a conventional predetermined cycle, can be prevented from occurring.

The present invention is not limited to each of the above-described embodiments, various modifications can be made within the scope of claims, and embodiments obtained by appropriately combining the technical means respectively disclosed in the different embodiments are also included in the technical scope of the present invention.

What is claimed is:

1. A signal measurement unit comprising:
an input unit that inputs an electric signal output from an external signal output equipment;
an analogue measurement unit that measures a voltage value of the electric signal input in the input unit as an analogue value;
a counting measurement unit that counts at least one of a number of times that the voltage value of the electric signal input in the input unit has equaled or exceeded a predetermined first threshold value and a number of times that the voltage value has equaled or fallen below a predetermined second threshold value, wherein
the input unit selects whether to transmit the electric signal that is input to the analogue measurement unit or to the counting measurement unit, and the input unit comprises a plurality of input terminals and selects whether to transmit the electric signal that is input to the analogue measurement unit or to the counting measurement unit for each of the input terminals;
a comparison portion that determines matching between a count measurement value and a target value, the count measurement value being obtained by measuring an electric signal input at a first input terminal of the input terminals by the counting measurement unit; and
an output control unit that outputs, if the comparison portion determines that the count measurement value matches the target value, an analogue measurement value obtained by measuring the electric signal input at a second input terminal of the input terminals by the analogue measurement unit at that time.

2. The signal measurement unit according to claim 1 further comprising an input setting unit that receives a setting instruction of whether to transmit the electric signal input in the input unit to the analogue measurement unit or to the counting measurement unit via a communication line.

3. The signal measurement unit according to claim 1, further comprising a threshold value setting unit that receives a setting instruction of at least one of the first threshold value and the second threshold value via a communication line.

4. The signal measurement unit according to claim 1, wherein if the comparison portion determines that the count measurement value matches the target value, the output control unit stores, in a buffer, an analogue measurement value obtained by measuring the electric signal input at the second input terminal of the input terminals by the analogue measurement unit at that time, and outputs a plurality of analogue measurement values stored in the buffer to an external device in a predetermined communication cycle for communication.

* * * * *